(No Model.)
J. B. LINCOLN.
ROLLER SKATE.
No. 302,503. Patented July 22, 1884.
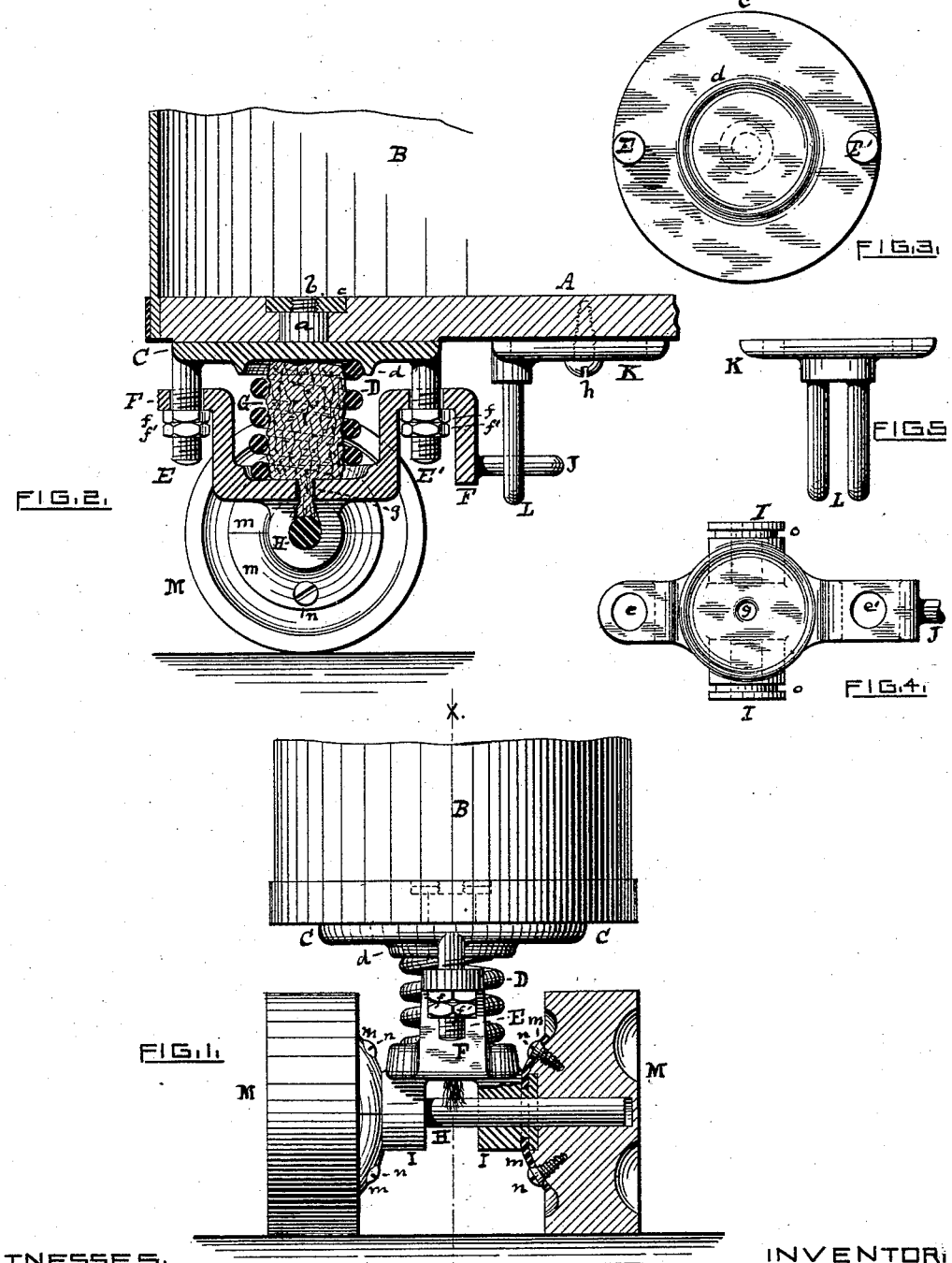
WITNESSES:
William B. M. Hallett
Warren R. Pierce
INVENTOR:
Jesse B. Lincoln

United States Patent Office.

JESSE B. LINCOLN, OF EAST PROVIDENCE, RHODE ISLAND.

ROLLER-SKATE.

SPECIFICATION forming part of Letters Patent No. 302,503, dated July 22, 1884.

Application filed April 3, 1884. (No model.)

*To all whom it may concern:*

Be it known that I, JESSE B. LINCOLN, of East Providence, in the county of Providence, in the State of Rhode Island, have invented a certain new and useful Improvement in Roller-Skates; and I declare the following to be a specification thereof, reference being had to the accompanying drawings.

Like letters indicate like parts.

Figure 1 is an end view of my improved skate, partly in elevation and partly in vertical section. Fig. 2 is a vertical section on line $x\,x$ of Fig. 1. Figs. 3, 4, and 5 are detail views.

My invention relates to the mounting and lubrication of the rollers upon the axle, and to the adjustment of the spring and oscillation of the truck; and it consists of the devices hereinafter described, and specifically pointed out in the claims.

In the drawings, A represents the foot-board of the skate, and B the heel band or strap, fastened thereto in the usual manner. A bed-plate, C, (of which a plan of the under surface is shown in Fig. 3,) is fastened to the foot-board A by the central stud, $a$, which has the screw-thread $b$ on its end, and the nut $c$, as shown in Fig. 2. By means of this method of fastening, the plate C is capable of a slight rotation. A circumferential ridge, $d$, is centrally located on the under side of the plate C, and forms a cup-like concavity to keep in position the spiral spring D, upon which the skate rests. There are two posts, E E', extending downward from the bed-plate C at front and rear, as shown in Figs. 1 and 2. The truck F is made preferably in the shape shown in Figs. 1, 2, and 4, Fig. 4 being a plan of the same upon its upper side. The truck has a cup-like depression at its center, as fully shown in said figures, to receive the lower end of the coiled spring D. Its front and rear ends are in the angular directions shown in Fig. 2, and have holes $e\,e'$, through which the posts E E' of the bed-plate C pass, and nuts and check-nuts $f\,f'$ upon the screw-threaded ends of said posts hold the truck F in position thereon.

Inside the coil of the spring D is inserted cotton waste, G, or other material suitable to hold oil by saturation, and the fibers of the same extend downward through the central aperture, $g$, of the truck and convey the lubricant to the axle H, whence the oil works along the axle through the hubs and into the rollers on each side. The truck F has on its under surface the hubs I, and upon its inner end a stem or rod, J. A regulator, K, (shown in end elevation in Fig. 5,) has two longitudinal slots on each side, (shown in dotted lines in Figs. 2 and 5,) through which slots screws $h$ are inserted into the foot-board A, by which said regulator is capable of longitudinal adjustment, and can be held in any desired position by the snug driving of said screws. The regulator K has two posts, L, extending downward at a right angle therefrom, between which the stem J of the truck F passes. The rollers M have a central bore from the rear, extending almost to the front, as shown in Fig. 1, to receive the ends of the axle H. They are secured upon the axle by means of two half-washers, $m\,m$, through which the screws $n\,n$ pass into the wheel. These washers at their center fit loosely into the grooves $o$ of the hubs I, thus preventing the rollers from slipping off the axle.

It will be seen that by my device the skate rides upon and is supported by the spring D, thus dispensing with the rigid connection of the skate and truck heretofore common. All jarring in riding over an uneven surface or floor is thus prevented, and the ease and comfort of the skater is secured. The holes $e\,e'$ of the truck F are somewhat elongated transversely, to exceed the diameter of the posts E E', which pass through them, and so allow a slight lateral movement of the truck. These holes $e\,e'$ on their sides serve as stops to limit the oscillation of the truck. The posts L are moved by and with the regulator K (which is adjustable, as above shown) upon the stem J to any desired distance, and serve as a fulcrum for the leverage of the truck as the latter oscillates toward one side or the other by the pressure of the foot upon the skate on the inside of the curve which the skater is describing in his course. By such depression the spring D is compressed on either side at will, and the wheels thereby assume such angular direction as to travel in the curve required. By adjusting the regulator K nearer the truck the length of such leverage is decreased and the truck is operated by a less movement of the ankle.

For beginners, it is desirable that the truck should be quite rigidly kept in position, which is done by adjusting the regulator and its posts farther from the truck, while for expert performers or for exhibition maneuvering it is desirable to describe shorter curves, which is accomplished by moving the regulator with its post nearer the truck.

The posts L are best made of spring-wire, so placed as to keep in forcible contact with them the interposed rod J, thus preventing any rattling. So, too, an adjustment of the tension of the spring D is possible by means of my contrivance, and this feature is a useful novelty in roller-skates. Such adjustment is accomplished by means of the nuts and check-nuts $f f'$, which crowd up the truck F against the spring D to such extent as desired, thus stiffening the spring. In this manner the same skates can be adjusted to the weight of the person, a heavy person requiring a stiffer spring than a person of lighter weight. The lubricating-waste is held securely within the coils of the spring D, and by its contact with the axle, through the central aperture of the truck, supplies oil to the rollers without any danger of soiling the garments.

My improved method of mounting the rollers upon the axle, by which contrivance the rollers are not bored through, leaves a plane or smooth face to the wheels, thus dispensing with the usual pin-fastening and the projection of the axle beyond the face of the wheel. Great difficulty and danger have been experienced in the use of roller-skates as commonly mounted because of the liability of the projecting portion of the axle to strike against the rollers of the skates in passing, and by such collision tripping the skater and chipping the roller which it strikes against. This danger is entirely obviated by my method of mounting. Another great advantage is, that it prevents the oil from working through the wheel and spattering therefrom, as is usual when the axle passes completely through the roller.

Instead of partially boring through the roller, as above described, the wheel may be bored entirely through, but the portion of the bore beyond the axle may be stopped by a plug driven in from the front of the wheel; but such a construction would be within my invention as a mere mechanical modification thereof.

I claim as a novel and useful invention and desire to secure by Letters Patent—

1. In a roller-skate, the foot-board A, having a bed-plate, C, with posts E E', in combination with the spring D and truck F, having hubs I, axle H, and rollers M, substantially as described.

2. In a roller-skate, the bed-plate C, posts E E', and spring D, in combination with the truck F, mounted on said posts, and the nuts $f f'$, to regulate the tension of the spring D, substantially as shown.

3. The slotted regulator K, adjustable upon the foot-board A, as described, and having posts L L, in combination with the truck F, having the stem J, and mounted upon the posts E E' of the rotating bed-plate C, substantially as and for the purpose specified.

4. The truck F, having the aperture $g$, hubs I, axle H, and rollers M, in combination with the coiled spring D and lubricating material G, substantially as specified.

JESSE B. LINCOLN.

Witnesses:
WILLIAM B. W. HALLETT,
WARREN R. PERCE.